(12) United States Patent
Nordaa

(10) Patent No.: US 7,122,510 B2
(45) Date of Patent: Oct. 17, 2006

(54) ONE-BATH PARTICLE-FREE CHEMICAL CLEANING

(76) Inventor: Magnor Nordaa, P.O. Box 3022, N-4392, Sandnes (NO)

( * ) Notice: Subject to any disclaimer, the term of this patent is extended or adjusted under 35 U.S.C. 154(b) by 0 days.

(21) Appl. No.: 11/099,676

(22) Filed: Apr. 6, 2005

(65) Prior Publication Data
US 2005/0227878 A1 Oct. 13, 2005

(30) Foreign Application Priority Data
Apr. 7, 2004 (NR) .................................. 20041467

(51) Int. Cl.
*C11D 17/00* (2006.01)

(52) U.S. Cl. ....................... 510/247; 510/253; 510/254; 510/264; 510/434; 134/22.1; 134/22.18; 134/22.19; 134/22.14

(58) Field of Classification Search ..................... None
See application file for complete search history.

(56) References Cited

U.S. PATENT DOCUMENTS

| | | |
|---|---|---|
| 3,084,076 A | 4/1963 | Loucks |
| 5,360,488 A | 11/1994 | Hieatt et al. |
| 2003/0004081 A1 | 1/2003 | Ellis et al. |

FOREIGN PATENT DOCUMENTS

| | | |
|---|---|---|
| GB | 1 306 855 | 2/1973 |

*Primary Examiner*—Necholus Ogden
(74) *Attorney, Agent, or Firm*—Birch, Stewart, Kolasch & Birch, LLP

(57) ABSTRACT

The invention relates to a method for one-bath chemical cleaning and preservation of interior surfaces of hollow steel bodies, without any organic solvents, comprising controlled change of the liquid bath in that in a circuit of hoses running from a mobile tank equipped with a pump unit and steam generator there is circulated a liquid stream to a defined cavity of steel. The composition of the liquid is changed methodically by the addition of fresh chemical additives until the end of the process. Fresh water at 80° C. has added thereto an alkaline degreasing liquid A containing chlorine-free tensides, which is circulated, whereupon cleaning liquid B, consisting of citric acid with added cationic tensides, is added to a pH of 4.5 and is circulated. There is then added a complexing derusting liquid C, with active modified aminocarboxykate made biologically degradable, with adjustment of the pH to 4.5–5.0 with cleaning liquid B, and extra addition of the complexing agent if derusting liquid C falls below 5% by weight, until the iron content of the liquid is stable. For passivation, a non-ionic passivating and neutralising liquid D, consisting of alkaline degreasing agent and non-ionic, chlorine-free tensides, is added to pH 7.0–7.5, after which there is added 2–4% by weight of inhibiting liquid E, consisting of a chain molecule of a chelate, active at pH>7, which functions as a supplement to the aminocarboxylate. A gluconate with heptonate and silicate provides a diffusion-proof microfilm on the steel surface.

1 Claim, No Drawings

ONE-BATH PARTICLE-FREE CHEMICAL CLEANING

The invention relates to a method for one-bath particle-free chemical system cleaning and preservation of interior surfaces of hollow steel bodies without any organic solvents, comprising a controlled change of the liquid bath composition.

The method is used to degrease, de-rust, passivate and corrosion-proof internal steel cavities such as pipe systems for fire protection, for drinking water and for process water on ships, offshore installations, tanks and the like.

The method according to the invention represents a substantial simplification both of procedures and of the use of chemicals, and as such breaks with traditional and often time-consuming chemical and mechanical cleaning processes.

Discharges into the environment often cause problems in connection with the traditional chemical methods which use, in part, toxic and environmentally harmful solvents of the type trichloroethylene, acetone, xylene and similar strong inorganic acids such as nitric and sulphuric acids.

The fundamental difference between the method according to the invention and the use of traditional acid treatment is as follows: The $H^+$ ions of the acids preferably do not react with the corrosion deposits, but with the steel below, and thereby cause a cracking of the rust scale, which can then be flushed away using liquid circulation. When cleaning fairly old pipe systems, this is a feared reaction which further damages the condition of the pipes. The loosened rust forms large amounts of rust particles, which places demands on filtration. In hydraulic systems there is a total ban on particle residues, and advanced filter systems are required in order to use acid treatment.

As background art, reference is made to the following document from the patent literature:

U.S. 2003/0004081 A1 describes a composition and a method for the in situ removal of scale from a substrate, in particular the removal of silicate-containing scale from interior surfaces of boilers and other heat exchange equipment. The composition includes chelating agents (A) and a basic agent (B). Component A has at least two carboxylic acid functional groups, and is preferably citric acid. Other chelating agents may be gluconic acid and EDTA. Component A is present in the composition in an amount of 5–25% by weight based on the total weight of the composition. Component B is an alkali metal, preferably NaOH, KOH or mixtures thereof, and is present in the compound in an amount such that a pH of 10–14 is established. The composition may also contain a pH indicator, a corrosion inhibitor and dispersants. The composition is circulated in contact with the substrate, preferably at 50–110° C. for 1–48 hours. If necessary, several steps in which the composition is circulated can be carried out. After completed treatment, the substrate is flushed with water and passivated using known methods; cf paragraphs 0010 to 0027.

The method according to the invention represents a completely different approach, as the chemicals that are added react with the corrosion deposits (oxides and hydroxides) and not with bare metal. Also, the reactions do not form particles, but the deposits change into a colloidal form, that is to say new molecules are formed which are too small to be registered in a particle count.

The advantages are:
more careful treatment of old pipes
simplified filtration
smaller risk of personal injury and damage to equipment
savings in terms of costs, time and energy
significant environmental improvements.

From a health point of view, a number of improvements are obtained for the personnel working in this industry by the elimination of the substantial damage caused by leakage during operations and by discharges into the surrounding environment. The alternative would otherwise be the bringing ashore of the residual liquids for costly destruction. High-pressure flushing has been found to be inefficient and expensive, and has basically been abandoned as a cleaning method. The costs involved in the use of the claimed method represent 15–20% of the costs involved in replacing pipes with new ones. When parts of a pipe system are disconnected for cleaning, the whole facility is normally put out of operation, with subsequent reduced safety and/or a slow-down in operations.

The invention is based on a so-called one-bath system, and the cleaning is carried out in four steps, but using the same bath from the first to the last step. In special cases the bath may be changed between step III and IV in order to obtain an effect beyond the standard effects, such as particle removal in hydraulic systems and the like.

The effect of the chemicals in the system is controlled by parameters such as empirical and predetermined surface state, liquid flow, pH control, iron analyses and analyses of complexing agent and temperature of the bath. The chemicals are carefully adapted to each other throughout the system. The use or admixture of other chemicals may interfere with the desired effect, and incorrect use could cause unwanted effects. In addition to a knowledge of the chemistry of the system, there is also a not insignificant mechanical technology associated with the actual implementation, especially in old, rust-encrusted systems. To obtain the optimal, desired effect, it is necessary that the personnel carrying out the cleaning should have the knowledge that a somewhat difficult operation of this type calls for.

In the case of offshore fire-fighting systems, there are particular difficulties as regards the closing down of the systems because of continuous safety requirements. By taking some relatively simple measures, the so-called dry fire protection systems, in which the pipes are not pressurised with water, can be cleaned without the system having to be wholly or partly closed down.

In order to analyse and monitor the chemical processes that take place, a mobile laboratory, an analysis kit, has been developed which will follow all operations, and which also will be led by an operator who possesses a knowledge of the analysis methods and the parameters that are to be monitored during the cleaning operation.

When a cleaning operation is initiated, a defined part of the pipe system, the tank and the like are connected by hoses to a transportable unit consisting of an appropriate mixing tank for chemicals, a pump and filters. With the aid of this unit differing chemical baths can be made to circulate/recirculate in a defined circuit until all contaminants, including rust, have been removed from the steel surface.

The process is terminated by passivation/de-ionisation of the exposed metal surface and finally an inhibitor is added that coats the metal surface with a microfilm in order to prevent new corrosion formation.

The whole process is carried out in one operation, the chemicals being added to a water bath in the correct order and at the correct intervals of time, based on continuous analyses and the tasks the chemicals are formulated to carry out.

The method according to the invention includes five different chemical liquids that are adapted to each other in that through the process they ultimately have a neutralising effect on each other. They are all water-soluble, and inorganic acids or organic solvents are not used. The chemicals are tested and adapted to the OSPAR (formerly PARCOM) rules, which permit discharge into the external environment after use.

The present application relates to a method for one-bath particle-free chemical cleaning and preservation of interior surfaces of hollow steel bodies without any organic solvents, comprising a controlled change of the liquid bath composition, and the method is characterised by the characteristic features set forth in the patent claim.

Procedure description of the method:
Mounting of connecting flanges at both ends of the defined cavity, for example, a pipe system, that is to be cleaned, and on connector and instrument flanges.
Chemical-resistant pressure hoses are mounted to run between a mobile chemical tank and pump and the lowest point of elevation of the pipe system. A hose for recirculation is mounted between the highest point of elevation and filters. A flowmeter, temperature sensor and manometer report continuously to a printer unit.
The system is filled with fresh water and vented at all accessible high points.
The pump is started for circulation of fresh water for leakage check.
A steam generator heats the circulating water to 80° C.
Calculated addition of degreasing liquid A for circulation for a minimum of 30 mins.
Calculated addition of pH-adjusting cleaning liquid B to a pH of 4.5 is circulated at a stable pH for 15 mins.
The liquid stream is reversed and circulated for another 15 mins.
Calculated addition of 5–10% by weight of a complexing derusting liquid C is subsequently pH-adjusted to 4.5–5.0 with pH-adjusting cleaning liquid B at a temperature of 65–70° C.
Circulation of liquid stream for 60 mins, with monitoring of pH and temperature. Iron content and active, modified aminocarboxylate as complexing agent are analysed.
The liquid stream is reversed every 60 mins with continuous analyses.
If the complexing derusting liquid C falls below 5% by weight, extra complexing derusting liquid C is added and subsequently pH-adjusted with pH-adjusting cleaning liquid B.
The liquid is circulated and recirculated until its iron content is stable.
Calculated addition of non-ionic, chlorine-free passivating and neutralising liquid D to pH 7.5. Colour change to red liquid shows a change in pH to 7.0–7.5.
Circulation of liquid stream for 30 mins at a temperature of 60° C.
Calculated addition of 2–4% by weight of inhibiting liquid E is adjusted to pH 7.5 with pH-adjusting cleaning liquid B.
After 2×15 mins circulation, the treatment is terminated and the pipe system is drained.
Once the process has been completed, all drain plugs and valves are opened where possible, whereupon the cavity, for example, the pipe system, is blown empty of liquid using pressurized air. Flanges and hose couplings are dismantled.
A visual inspection of the interior surfaces of the pipes is conducted for reporting.

The chemical compositions and effect of the liquids and the order in which they are added:

A Degreasing Liquid

The main ingredient is an alkaline degreasing agent that emulsifies the fatty acids, whilst chlorine-free, cationic tensides reinforce the wash-out effect of the emulsified grease molecules and intensify adhesion with chelates which on pH adjustment control the affinity to a group of metal ions high up or low down on the electropotential scale (the electromotive chain).

B pH-Adjusting Cleaning Liquid

Citric acid with added cationic tensides to expose the corrosion deposits. Subsequent adjustment of pH to 4.5–5.0 with pH-adjusting cleaning liquid B at 65–70° C.

C Complexing Derusting Liquid

About 50% active modified aminocarboxylate with added gluconic acid, gluconate and, pH-adjusted to about 9.0 with citric acid and acetate. As a composite complexing agent, this liquid has its optimal affinity range to metal ions in that an ammonium ion changes place with a metal ion in the complex molecule; the ammonium molecule that is released splits into ammonia and hydrogen in the solution. $NH_3$ as such functions as a new donor (complexing agent) and thus enhances the overall effect.

D Passivating and Neutralising Liquid

This alkaline liquid contains non-ionic, chlorine-free tensides and its task is to pH-adjust to 7.0–7.5 for passivation of the steel surface in that the non-ionic tensides de-ionise the steel and reduce particle adhesion.

E Inhibiting Liquid

The main component is an active chain molecule of a chelate, active at pH>7, which functions as a complement to an aminocarboxylate. A gluconate with heptonate and silicate forms a diffusion-proof microfilm on the steel surface which thus protects against new corrosive attack, also in the liquid phase.

Inhibition can take place both in constantly liquid-filled pipes and in pipes which, after inhibition, are drained and dried.

The invention claimed is:

1. A method for one-bath particle-free chemical cleaning and preservation of interior surfaces of hollow steel bodies without any organic solvents and which have a controlled change of the liquid bath composition, comprising a circuit of hoses running from a mobile tank equipped with a pump unit and steam generator to a defined cavity of steel, via filters back to the mobile tank in order to circulate a liquid stream whilst temperature is monitored, which methodically can change the chemical composition of the liquid exclusively by means of fresh additives until the end of the process, the liquid at the start is constituted by fresh water heated to 80° C., whereto is added a degreasing liquid A comprising an alkaline degreasing agent and chlorine-free, cationic tensides and chelates and circulating for a minimum of 30 mins, whereupon, a pH-adjusting cleaning liquid B comprising citric acid added cationic tensides is added to a pH of 4.5 and circulating for 15 mins, whereupon 5–10% by weight of a complexing derusting liquid C comprising about 50% by weight of active, modified aminocarboxylate and made biologically degradable, which is added gluconic acid, gluconate and heptonate pH-adjusted to about 9.0 with citric acid and acetate, is added with subsequent adjustment of the pH to 4.5–5.0 with the cleaning liquid B at a temperature of 65–70° C., followed by circulation at intervals of 60 mins with pH control, and further addition of the complexing derusting liquid C if the complexing derusting liquid C falls below 5% by weight until the iron content of the liquid is stable, whereupon non-ionic passivating and neutralising liquid D is added, which comprises an alkaline degreasing agent and non-ionic, chlorine-free tensides in order to adjust the pH to 7.0–7.5 for de-ionizating the steel surface when circulating for 30 mins at a temperature of 60° C., whereupon 2–4% by weight of inhibiting liquid E is added, which comprises a chain molecule of a chelate, active at pH>7, which functions as a complement to the aminocarboxylate, in that a gluconate with heptonate and silicate forms a diffusion-proof microfilm on the steel surface during 2×15 mins circulation before draining, whereupon the defined cavity is blown empty of liquid using pressurized air, wherein inhibition can take place both in constantly liquid filled pipes and in pipes which, after inhibition, are drained and dried.

\* \* \* \* \*